United States Patent [19]

Ginther et al.

[11] Patent Number: 5,361,946

[45] Date of Patent: Nov. 8, 1994

[54] ICING DISPERSING APPARATUS

[76] Inventors: Pamela J. Ginther, 3004 E. 133RD Cir., Thorton, Colo. 80241; Valerie A. Washburn, 9595 N. Pelos #372, Thorton, Colo. 80221; Lyle Picraux, P.O. Box 70, Lafayette, Colo. 80026

[21] Appl. No.: 63,724

[22] Filed: May 20, 1993

[51] Int. Cl.$^5$ .............................. B67D 5/42
[52] U.S. Cl. ........................ 222/175; 222/389
[58] Field of Search .......... 222/323, 327, 175, 389

[56] References Cited

U.S. PATENT DOCUMENTS

| | | | |
|---|---|---|---|
| 2,615,598 | 10/1952 | Watkins et al. | 222/389 |
| 2,692,706 | 10/1954 | Wiksten | 222/389 |
| 2,707,068 | 4/1955 | Williamson | 222/175 |
| 2,838,210 | 6/1958 | Detrie et al. | 222/389 |
| 3,136,456 | 6/1964 | Sherbondy | 222/389 |
| 3,237,814 | 3/1966 | Collar | 222/389 |
| 3,439,839 | 4/1969 | Schumann et al. | 222/389 |

Primary Examiner—Andres Kashnikow
Assistant Examiner—Philippe Derakshani

[57] ABSTRACT

A viscous material dispenser employing pneumatic air power for dispensing cake icing onto a cake. The dispenser utilizes interchangeable cylindrical cake icing cartridges which facilitate easy changing of the icing type or color without significant cleaning of the device. The dispenser rests upon the forearm of a user and is manipulated by a handle placed near the dispensing tip to allow for steady movement of the dispenser by the user.

2 Claims, 4 Drawing Sheets

ICING DISPERSING APPARATUS

BACKGROUND OF THE INVENTION

1. Field of the Invention

The present invention relates to material dispensers and more particularly pertains to material dispensers which may be used to dispense cake icing.

2. Description of the Prior Art

Methods of dispensing cake icing are well known and usually comprise putting icing into collapsible paper cones that may be squeezed by the operator to dispense the icing through the tip of the cone. This method and apparatus requires a great deal of fatiguing effort on the part of the operator to squeeze the cone, as well as to move the tip of the cone about the cake to produce the desired icing decorations. Furthermore, the cone structure may, on occasion, rupture and therefore render the device useless. Because of the deficiencies in this particular method and apparatus, other types of dispensers have been employed to dispense cake icing.

For example, a motorized apparatus for dispensing cake icing can be seen in U.S. Pat. No. 4,421,251. This device utilizes an electric motor to squeeze a collapsible icing bag, thereby to dispense icing contained within the bag onto a cake.

Another icing gun system for decorating confectionery articles is illustrated in U.S. Pat. No. 3,866,838 which utilizes a pressurized reservoir and hose assembly to dispense cake icing.

Still another device of interest is a hand operated dispenser of icing for cakes that is disclosed in U.S. Pat. No. 4,966,537. This invention dispenses icing through a cylinder and a plunger arrangement which is operated by a manual hand lever.

The aforementioned apparatuses and methods allow a user to dispense icing onto a cake but they do not provide for both the rapid changing of icing styles or colors as well as the accurate and precise dispensing of cake icing. Some of the above mentioned devices must be flushed out and thoroughly cleaned before a different style or different color of icing may be dispensed. Other devices utilized for icing cakes create strain upon an operators wrist and are difficult to control which results in an icing dispenser that precludes accurate and artistic placement of icing on a cake. Furthermore, some of the devices utilized for icing cakes produce a stream of material that is both nonuniform in size and that continues to flow briefly after the release of the trigger mechanism.

Therefore, it can be appreciated that there exists a continuing need for a new viscous material dispenser which utilizes interchangeable icing cartridges for rapid and easy changing of icing styles and colors, a novel operator support to reduce the stress placed upon an operator's arm, and a dispenser system that will dispense cake icing in a controllable and artistic manner. In this regard, the present invention substantially fulfills this need.

SUMMARY OF THE INVENTION

In view of the foregoing disadvantages inherent in the known types of cake icing dispensers now present in the prior art, the present invention provides a new viscous material dispenser construction wherein the same can be utilized to dispense cake icing in a manner that may be easily manipulated by the operator while also allowing for the rapid changing of the icing style or color. As such, the general purpose of the present invention, which will be described subsequently in greater detail, is to provide a new viscous material dispenser apparatus which has many of the advantages of the cake icing dispensers mentioned heretofore and many novel features that result in a viscous material dispenser which is not anticipated, rendered obvious, suggested, or even implied by any of the prior art cake icing dispensers, either alone or in any combination thereof.

To attain this, the present invention essentially comprises an icing cylinder for containing icing to be dispensed, and a pneumatic dispenser for creating pressure at a rear end of the icing cylinder to bias the icing through a nozzle assembly at a front end of the icing cylinder. The pneumatic dispenser comprises an icing cylinder support and a handle assembly mounted proximate the front end of the icing cylinder. The handle assembly includes a trigger mechanism for selectively allowing pressurized air from a pressurized air source, such as an air compressor, to be injected into the rear end of the icing cylinder which will bias a plunger axially down the icing cylinder, thereby dispensing the icing contained therein. The invention further comprises an arm rest that allows the device to rest comfortably on an operator's forearm which reduces the stress placed upon an operator's wrist.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new viscous material dispenser apparatus and method which has many of the advantages of the cake icing dispensers mentioned heretofore and many novel features that result in a viscous material dispenser which is not anticipated, rendered obvious, suggested, or even implied by any of the prior art cake icing dispensers, either alone or in any combination thereof.

It is another object of the present invention to provide a new viscous material dispenser which may be easily and efficiently manufactured and marketed.

It is a further object of the present invention to provide a new viscous material dispenser which is of a durable and reliable construction.

An even further object of the present invention is to provide a new viscous material dispenser which is susceptible of a low cost of manufacture with regard to both materials and labor, and which accordingly is then susceptible of low prices of sale to the consuming public, thereby making such viscous material dispensers economically available to the buying public.

Still yet another object of the present invention is to provide a new viscous material dispenser which provides in the apparatuses and methods of the prior art some of the advantages thereof, while simultaneously overcoming some of the disadvantages normally associated therewith.

Still another object of the present invention is to provide a new viscous material dispenser which utilizes interchangeable cylindrical cake icing cartridges to facilitate easy changing of an icing type or color without significant cleaning of the device.

Yet another object of the present invention is to provide a new viscous material dispenser which rests upon a forearm of an operator and which may be manipulated by a handle placed near a dispensing tip to allow for steady and accurate movement of the dispenser by the operator.

Even still another object of the present invention is to provide a new viscous material dispenser which will produce a stream of material that is uniform in size and that ceases to flow immediately after the release of a trigger mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
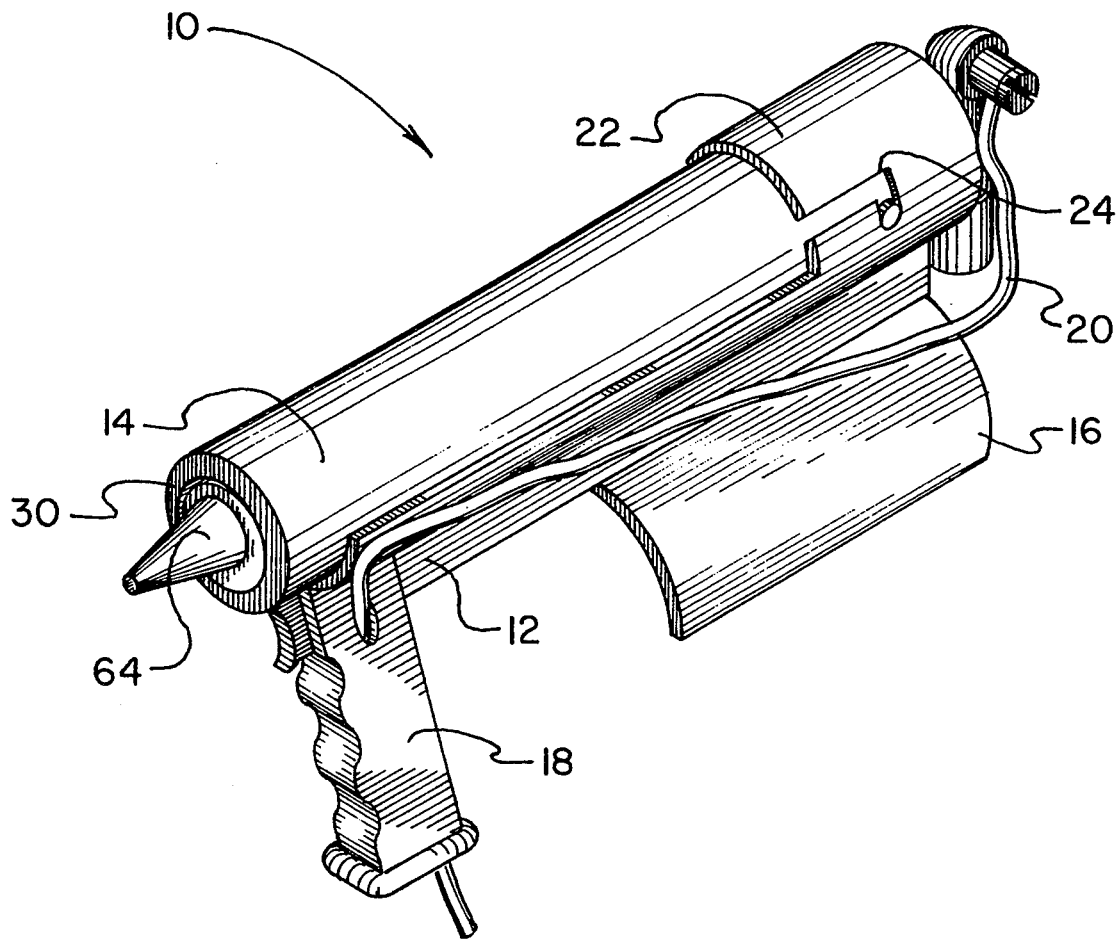
FIG. 1 is an isometric view of a viscous material dispenser comprising the present invention.
Figure 2:
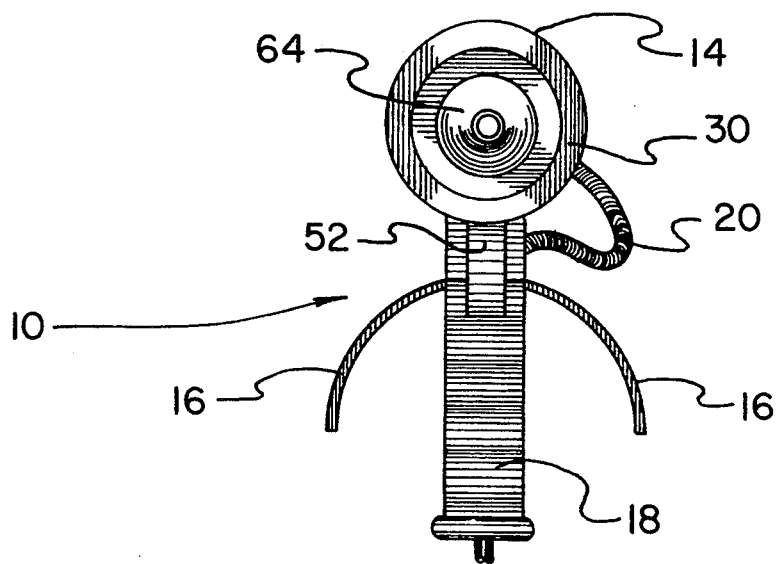
FIG. 2 is a front elevation view of the present invention.
Figure 3:
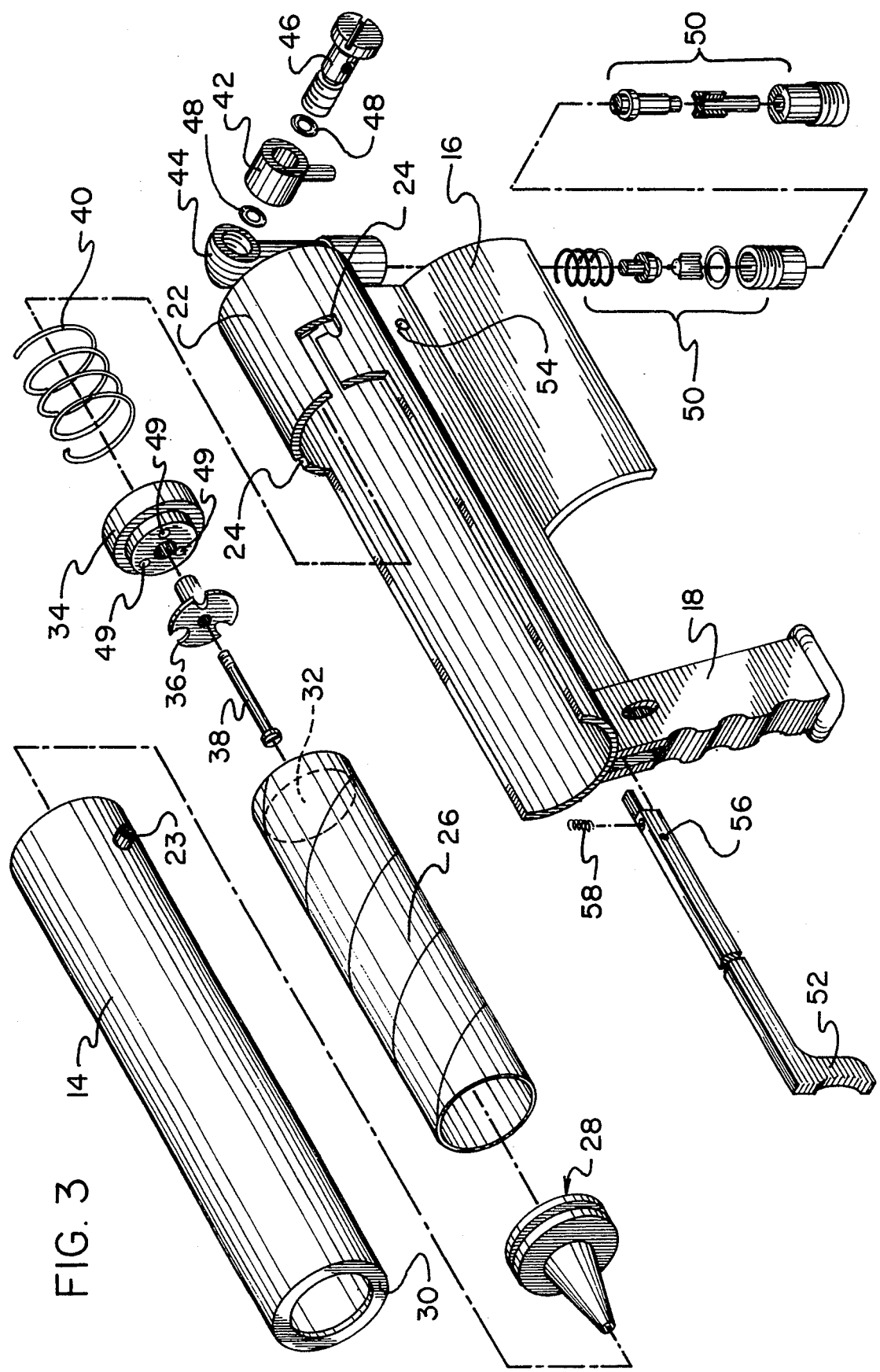
FIG. 3 is an exploded isometric view of the invention.
Figure 4:
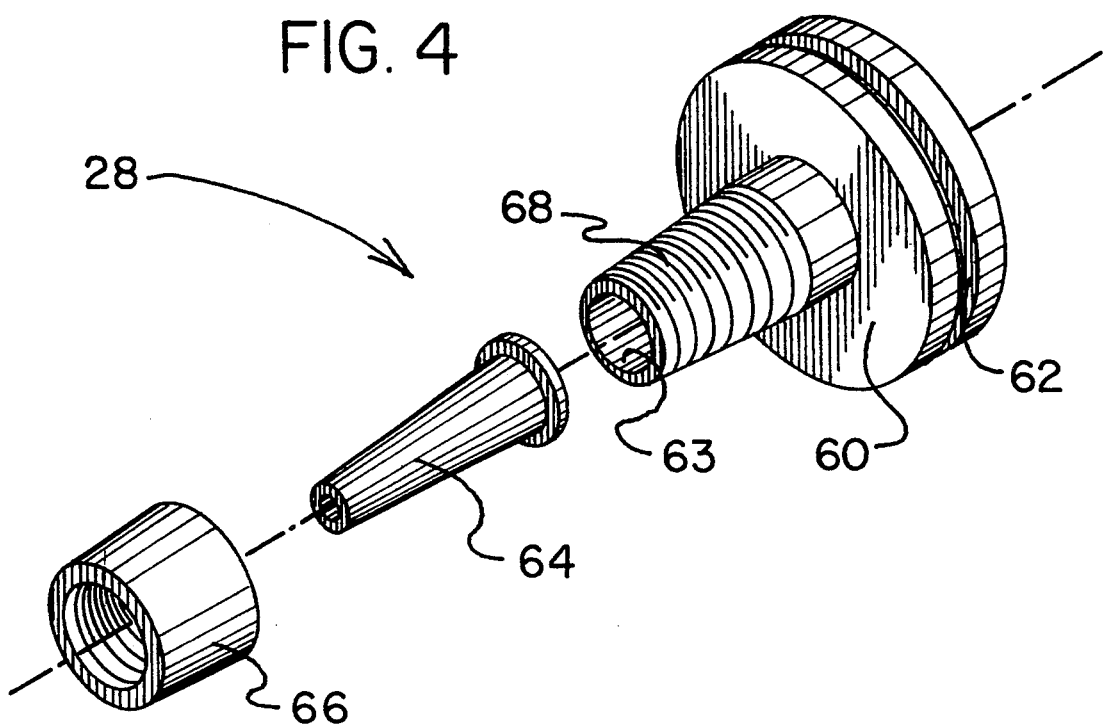
FIG. 4 is a exploded isometric view of a nozzle assembly forming a part of the present invention.
Figure 5:
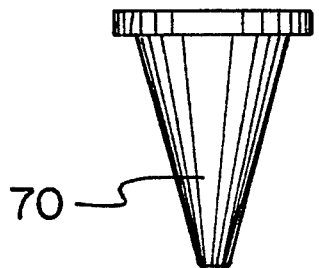
FIG. 5 is a front elevation view of a nozzle.
Figure 6:
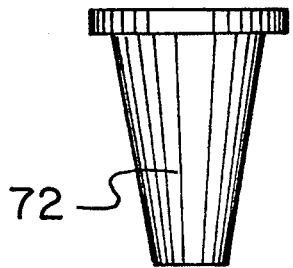
FIG. 6 is a front elevation view of a further nozzle.
Figure 7:
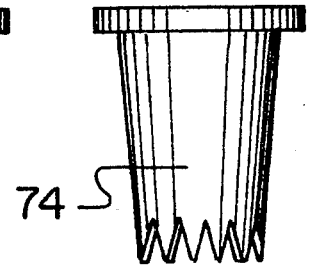
FIG. 7 is a front elevation view of an even further nozzle.
Figure 8:
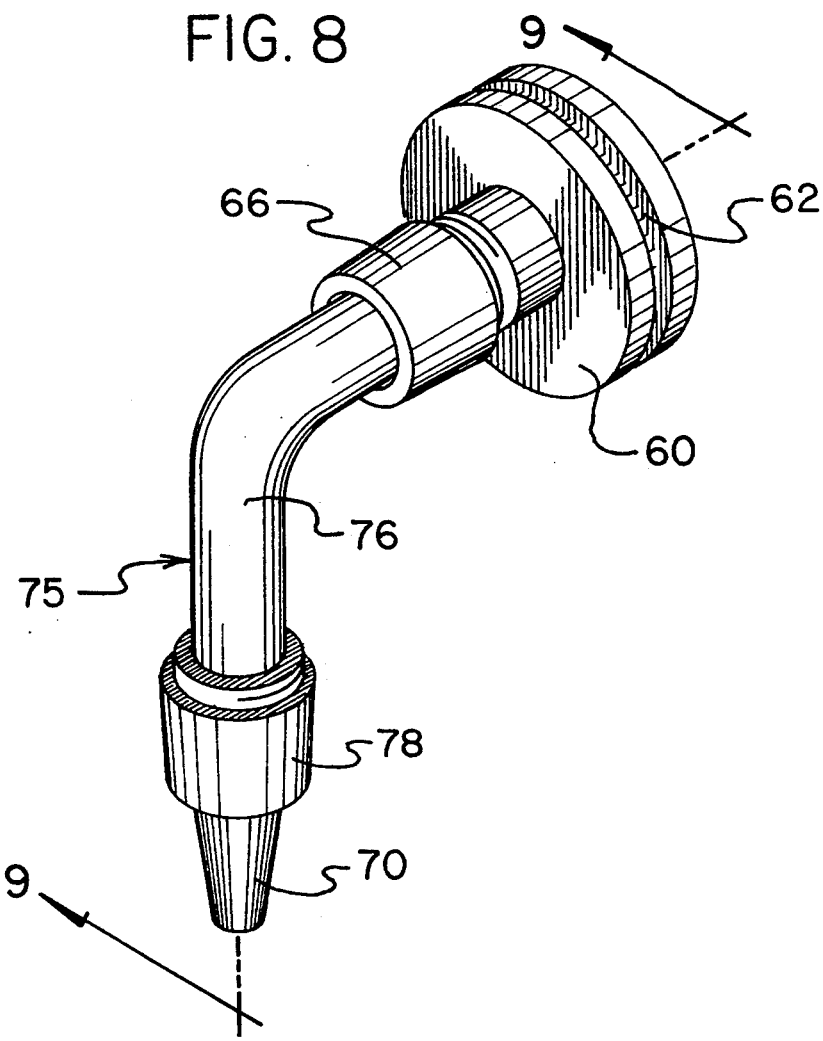
FIG. 8 is a perspective view of still yet another nozzle.
Figure 9:
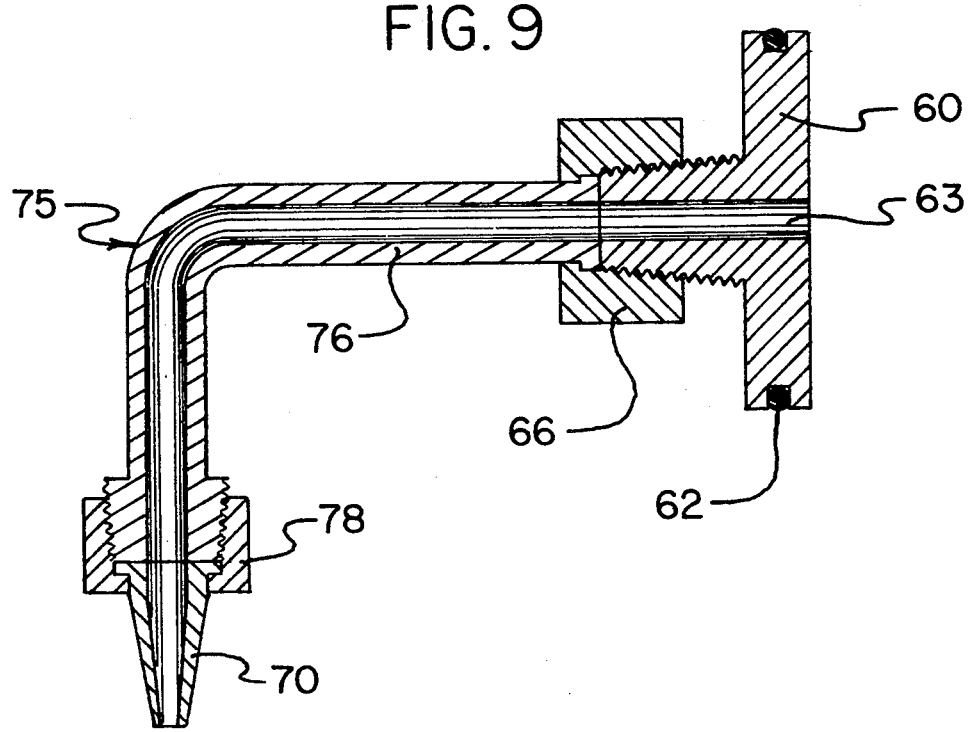
FIG. 9 is a cross section view taken along line 9—9 of FIG. 8.

With reference now to the drawings, and in particular to FIGS. 1-3 thereof, a new viscous material dispenser embodying the principles and concepts of the present invention and generally designated by the reference numeral 10 will be described.

More specifically, it will be noted that the viscous material dispenser 10 comprises a frame 12 that has a substantially hollow rectangular cross section and that is of the proper length to support a cylinder casing 14 disposed thereon. An arm rest 16 and a handle 18 are fixedly secured to the frame 12 to provide for respective support and manipulation of the device by an operator. The arm rest 16 is substantially arcuate in shape so as to partially encompass an operator's forearm which provides for the stable support of the dispenser thereon. The handle 18 is formed in such a manner so as to define an aperture along its length to allow for an air hose 20 to pass therethrough.

Attached to the frame 12 is a cylinder support 22 which receives and supports the cylinder casing 14. The cylinder casing 14 is a substantially hollow tubular member which includes a plurality of projections 23 that are operable to selectively engage a plurality of locking apertures 24 present in the cylinder support 22, thereby to removably secure the cylinder casing to the cylinder support. An icing cylinder 26 containing icing to be dispensed may be coupled to a nozzle assembly 28 and inserted within the cylinder casing 14. When placed within the cylinder casing 14, the nozzle assembly 28 rests against a flange 30 present on the cylinder casing which precludes axial movement of the nozzle assembly out of the cylinder casing during operation. The icing cylinder 26 includes a plunger 32 that may be biased axially down through the icing cylinder to expel the icing to be dispensed through the nozzle assembly 28 coupled thereto.

To provide for movement of the plunger 32 through the icing cylinder 26, air is releasably injected into the icing cylinder. A seal 34 is secured to the cylinder support 22 by a seal retainer 36 and a fastener 38. The seal 34 is biased towards the icing cylinder 26 by a seal spring 40. A swivel 42 is connected to a valve 44 by a swivel screw 46 and is allowed to sealably rotate about the swivel screw by a plurality of sealing washers 48. The air hose 20 is connected to the swivel 42 by conventional clamping means so that pressurized air from an air source may flow through the swivel and into the valve 44. The valve may be selectively operated to allow the passage of air through apertures 49 in the seal 34 to inject air into the icing cylinder 26 which will biasedly move the plunger 32 axially down the icing cylinder. The valve 44 contains valve operational components 50 that are shown for illustrative purposes and serve only to represent one of the many possible operational valve component assemblies known in the art which is operable to provide regulated passage of pressurized air through the valve during actuation and venting of the air thereafter.

The valve 44 is operated by a trigger 52 that is disposed within the frame 12. The trigger 52 is pivotably secured to the frame 12 by a pin (not shown) that passes both through an aperture 54 in the frame and an aperture 56 in the trigger. The trigger 52 operates the valve 44 by pivoting upon the pin which allows the trigger to engage the valve, thereby causing actuation of the valve. The trigger 52 is biased by a spring 58 so that upon release of the trigger, the valve 44 will cease to allow the passage of air therethrough. In addition, the valve 44 will vent air disposed within the icing cylinder 26 to the atmosphere, to thereby immediately terminate the dispensing of icing upon release of the trigger 52.

With reference now to FIGS. 4–9, the nozzle assembly 28 comprises a nozzle mount 60 that is substantially round and sized to fit within an end of the icing cylinder 26 to engage the flange 30 present on the cylinder casing 14. The nozzle mount 60 includes an O-ring seal 62 that is operable to prevent the passage of icing therepast. The nozzle mount 60 further includes a central aperture 63 to allow the passage of icing therethrough. A nozzle 64 may be coupled to the nozzle mount 60 by the use of a tubular fastener 66 which may be threadably engaged to threads 68 on the nozzle mount. A variety of nozzle diameters, shapes, lengths, patterns, or designs may be interchangeably attached to the nozzle mount with foregoing structure so as to facilitate a rapid changing of dispensing patterns. A first nozzle 70 may be used to provide for the dispensing of a narrow and substantially circular bead of icing. A second nozzle 72 may be engaged to the nozzle mount 60 to allow the dispenser to produce a thicker bead of icing. Further, a third nozzle 74 may be utilized to produce a thick bead of icing with an outer surface having a uniform pattern of increasing and decreasing radii therearound. A fourth nozzle 75 may be seen in FIGS. 8–9 and comprises an angled extension 76 and a further tubular fastener 78 for attaching any one of the aforementioned nozzles to the angled extension.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new icing dispensing apparatus comprising:
   a container for containing icing material to be dispensed;
   a support for receiving and supporting said container;
   a handle secured to said support;
   a plunger within said container for biasing said material out of said container;
   a movement means for moving said plunger through said container; and
   a nozzle assembly releasably secured to said support, said nozzle assembly being in fluid communication with said container for directing movement of said icing material,
   wherein said movement means comprises a pneumatic means for moving said plunger through said container,
   wherein said pneumatic means comprises a valve connected to a hose, said hose being connectable to an air source, a trigger communicating with said valve to selectively operate said valve, a seal for releasably sealing an end of said container, and at least one aperture in said seal to allow passage of pressurized air therethrough whereby said pressurized air may enter said container to bias said plunger axially through said container,
   wherein said handle is fixedly secured to said support proximate said nozzle assembly, and
   further comprising an arm rest fixedly secured to said support, said support comprising an elongated rectangular support member having first and second opposite ends, said support for receiving and supporting said container being mounted upon said rectangular support member between said first and second ends, said rectangular support further having a passageway therein extending from said first end toward said second end, said trigger comprising an elongate member mounted for pivotal movement in said passageway and extending from said rectangular support member through said first end thereof, said valve being mounted proximal to said support member second end whereby actuation of said trigger at said first end of said support member is effective to cause said elongate trigger member to pivot in said passageway and activate said valve, said handle and said arm rest being fixedly secured to said support between said first and second ends thereof and between said trigger and said valve.

2. The new viscous material dispenser of claim 1 wherein said nozzle assembly comprises a nozzle mount for receiving and releasably securing a nozzle thereon.

* * * * *